United States Patent
Shenk et al.

(10) Patent No.: US 9,646,287 B1
(45) Date of Patent: May 9, 2017

(54) DYNAMIC SAMPLE PAYCHECK

(75) Inventors: Eric E. Shenk, Mountain View, CA (US); Mindy Ann Eiermann, Los Angeles, CA (US)

(73) Assignee: Intuit Inc., Mountain View, CA (US)

( * ) Notice: Subject to any disclaimer, the term of this patent is extended or adjusted under 35 U.S.C. 154(b) by 152 days.

(21) Appl. No.: 13/492,623

(22) Filed: Jun. 8, 2012

(51) Int. Cl.
| | |
|---|---|
| *G06Q 30/04* | (2012.01) |
| *G06Q 10/10* | (2012.01) |
| *G09B 19/18* | (2006.01) |
| *G09B 19/00* | (2006.01) |
| *G09B 29/00* | (2006.01) |
| *G06Q 40/02* | (2012.01) |
| *G06Q 40/00* | (2012.01) |

(52) U.S. Cl.
CPC .................. *G06Q 10/105* (2013.01)

(58) Field of Classification Search
USPC ........... 705/32, 31, 39; 434/107, 110
See application file for complete search history.

(56) References Cited

U.S. PATENT DOCUMENTS

| | | | | |
|---|---|---|---|---|
| 8,219,470 B1 * | 7/2012 | Brown | ............... | G06Q 10/06 705/30 |
| 8,444,418 B1 * | 5/2013 | Buten | ............... | G06Q 40/00 434/107 |
| 2003/0149660 A1 * | 8/2003 | Canfield | ............... | G06Q 40/02 705/39 |
| 2004/0088234 A1 * | 5/2004 | Kelly | ............... | G06Q 10/06398 705/32 |
| 2007/0055592 A1 * | 3/2007 | Vu | ............... | G06Q 40/125 705/32 |
| 2007/0185792 A1 * | 8/2007 | Naib | ............... | G06Q 40/123 705/31 |
| 2009/0192926 A1 * | 7/2009 | Tarapata | ............... | G06Q 10/10 705/32 |
| 2009/0210330 A1 * | 8/2009 | Chen | ............... | G06Q 10/10 705/31 |
| 2012/0310799 A1 * | 12/2012 | Chen | ............... | G06Q 40/00 705/31 |

\* cited by examiner

*Primary Examiner* — Scott Zare
*Assistant Examiner* — Reva R Danzig
(74) *Attorney, Agent, or Firm* — Osha Liang LLP

(57) ABSTRACT

A method to generate a sample paycheck includes receiving, by a computer processor and from a user, a reduced portion of employee setup data prior to receiving a remainder portion of the employee setup data, where the reduced portion of employee setup data comprises at least partial employee payroll information, inputting the reduced portion of employee setup data into a payroll software application, dynamically generating, by the computer processor and prior to receiving the remainder portion, the sample paycheck based on the reduced portion, presenting the sample paycheck to the user, where the sample paycheck is dynamically generated and presented as the reduced portion of employee setup data is inputted, and receiving, in response to presenting the sample paycheck to the user, the remainder portion for use by the payroll software application during generation of a legal paycheck for the user.

20 Claims, 9 Drawing Sheets

300a SCREENSHOT A

◀ Back to Employee List
Enter Paycheck information

1  Federal and State Withholding — 301
Do you have a copy of IRS Form W-4 filled out by Felicia?
◉ Yes  ○ No  ○ Felicia is a contractor (1099 worker)
[Enter W-4]

2  Pay — 302
Rate
How much do you pay Felicia? [Choose one ▾]
⊕ Add more pay types (like Overtime, Sick, Vacation)
Schedule
How often do you pay Felicia? [Choose one ▾]

3  Deductions (optional) — 303
For health insurance, garnishments, retirement and so on.
⊕ Add a deduction

[Finish Later]  [Done]

304 SAMPLE PAYCHECK

Sample Check (Based on [40] regular hours)

305 CHEQUE

Date _____
Pay To The
Order Of _____  $ _____
Memo _____

306 PAYSTUB

Pay    Hours  Rate  Current  RTD   Deductions  Current  RTD
_____

Taxes          Current  RTD   Summary     Current  RTD
_____

300e SCREENSHOT E

Fern Dale

1  Federal and State Withholding  301

Address: 1 Main St. Palo Alto, CA 94306
SSN: ....0900

W-4 Info   State Info

| Filing Status | Single | Single or Married (with two or more incomes) |
| --- | --- | --- |
| Allowances | 0 | 0 |

State Taxes Information

Get these from the Form W-4 or your state withholding certificate.

CA Filing Status* [Single or Married (with two or more incomes) ▼] ⊙
Allowances [0] ⊙
Additional Amount [0]

⊕ Add more pay types (like Overtime, Sick, Vacation)   Add hourly rate ⊙   302

304 SAMPLE PAYCHECK      305 CHEQUE

Sample Check Calculations based on the pay schedule and rate you enter.

Mindy's Tea Shop    307         Date 05/07/2012
1 Main St                                  308
PA, CA 94306
Pay To The  Fern Dale                    $841.29
Order Of    309                            311

Memo   Eight hundred forty one and 29/100 _____ Dollars
                                312

314 CORRECTION DIALOG BOX

| RTD | Deductions | Current | RTD |
| --- | --- | --- | --- |
|  |  | Summary | Current |
|  | Current | Taxes | 358.71 |
|  | 213.32 |  |  |
|  | 50.40 |  |  |
|  | 17.40 |  |  |
|  | 65.59 |  |  |
|  | 12.00 |  |  |

CA Income Tax
CA State Disability Ins

[Cancel] [Continue]
         313

306 PAYSTUB

DYNAMIC SAMPLE PAYCHECK

BACKGROUND

A paycheck is traditionally a paper document (a cheque) issued by an employer to pay an employee for services rendered. In recent times, the physical paycheck has been increasingly replaced by electronic direct deposit to bank accounts. Such employees may still receive a pay slip, but any attached cheque is marked as non-negotiable and cannot be cashed. Generally, information such as payee, date, memo, etc. are printed on the paycheck. In some cases, the paycheck also has a printed authorized signature instead of being signed by a live person signer.

A pay stub, paystub, payslip, pay advice, or sometimes paycheck stub, is a document an employee receives either as a notice that the direct deposit transaction has gone through, or is attached to their paycheck. It typically details the gross income and all taxes and any other deductions such as retirement plan or pension contributions, insurances, garnishments, or charitable contributions taken out of the gross amount to arrive at the final net amount of the pay, also including the year-to-date totals in some circumstances.

When setting up a company's payroll configuration in a typical payroll software, the payroll software user (e.g., company accountant) is required to manually enter a complete set of company data, including entering federal and state tax information for each employee and for the employer, before the user is able to view a paycheck of any kind for verification purposes. If there is any error in a paycheck due to a data entry or payroll set-up mistake, the user has to go through a lengthy process to correct the mistake and verify that the error no longer shows up in a resultant paycheck.

SUMMARY

In general, in one aspect, the invention relates to a method to generate a sample paycheck. The method includes receiving, by a computer processor and from a user, a reduced portion of employee setup data prior to receiving a remainder portion of the employee setup data, wherein the reduced portion of employee setup data comprises at least partial employee payroll information, inputting the reduced portion of employee setup data into a payroll software application, dynamically generating, by the computer processor and prior to receiving the remainder portion, the sample paycheck based on the reduced portion, presenting the sample paycheck to the user, wherein the sample paycheck is dynamically generated and presented as the reduced portion of employee setup data is inputted, and receiving, in response to presenting the sample paycheck to the user, the remainder portion for use by the payroll software application during generation of a legal paycheck for the user.

In general, in one aspect, the invention relates to a system to generate a sample paycheck. The system includes a processor, a user interface (UI) executing on the processor and configured to receive, from a user, a reduced portion of employee setup data prior to receiving a remainder portion of the employee setup data, wherein the reduced portion of employee setup data comprises at least partial employee payroll information, input the reduced portion of employee setup data into a payroll software application, present the sample paycheck to the user, wherein the sample paycheck is dynamically generated and presented as the reduced portion of employee setup data is inputted, and receive, in response to presenting the sample paycheck to the user, the remainder portion for use by the payroll software application during generation of a legal paycheck for the user, and a sample paycheck generator executing on the processor and configured to dynamically generate, prior to receiving the remainder portion, the sample paycheck based on the reduced portion.

In general, in one aspect, the invention relates to a non-transitory computer readable medium storing instructions to generate a sample paycheck, the instructions, when executed by a computer processor, comprising functionality to receive, from a user, a reduced portion of employee setup data prior to receiving a remainder portion of the employee setup data, wherein the reduced portion of employee setup data comprises at least partial employee payroll information, input the reduced portion of employee setup data into a payroll software application, dynamically generate, prior to receiving the remainder portion, the sample paycheck based on the reduced portion, present the sample paycheck to the user, wherein the sample paycheck is dynamically generated and presented as the reduced portion of employee setup data is inputted, and receive, in response to presenting the sample paycheck to the user, the remainder portion for use by the payroll software application during generation of a legal paycheck for the user.

Other aspects of the invention will be apparent from the following detailed description and the appended claims.

BRIEF DESCRIPTION OF DRAWINGS

FIGS. 3A-3E shows an example of screenshots for dynamic sample paycheck in accordance with one or more embodiments of the invention.

DETAILED DESCRIPTION

Figure 1:
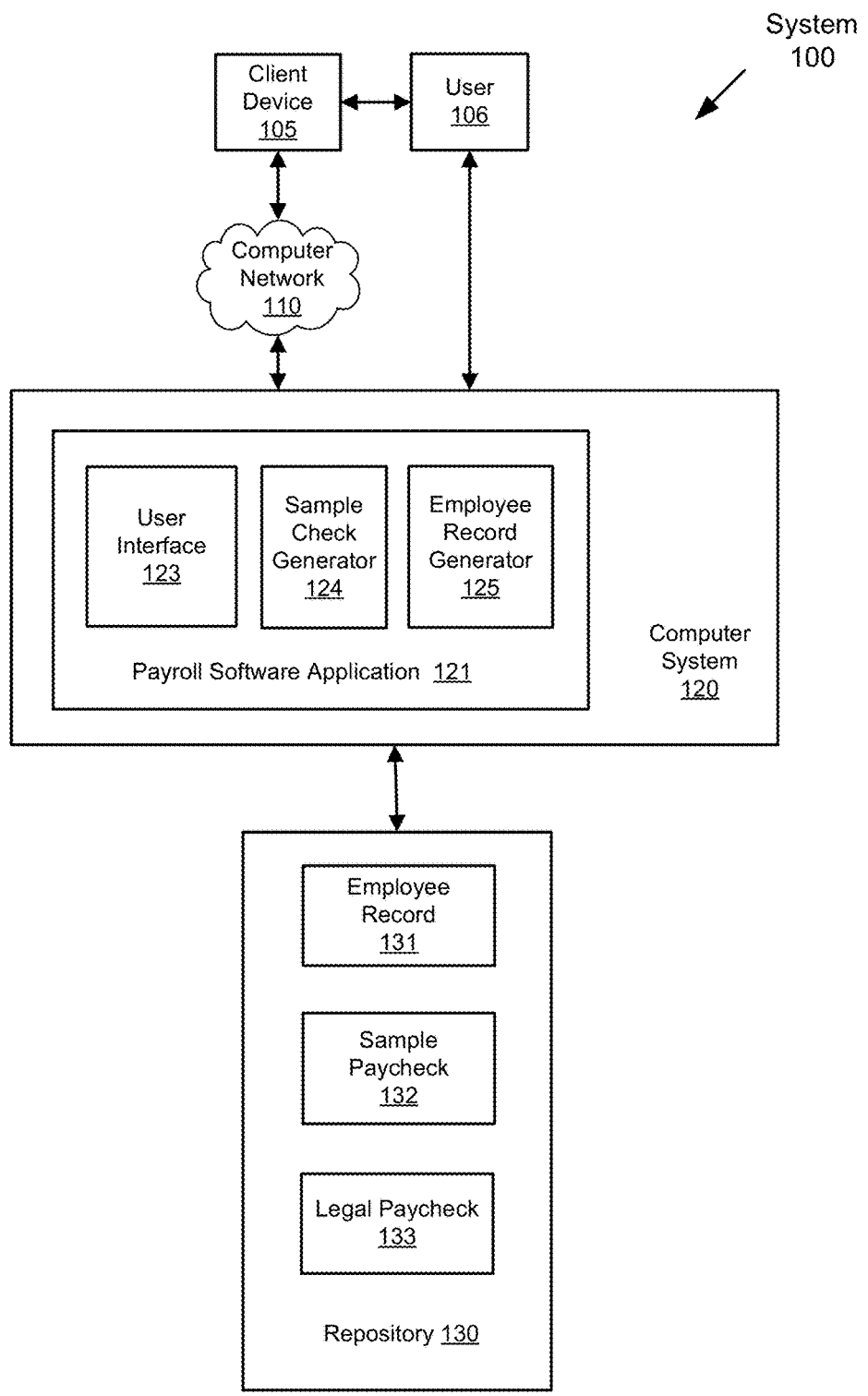
FIG. 1 shows a schematic diagram of a system for dynamic sample paycheck in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Generally, users of a payroll software application want to see a paycheck produced by the payroll software as quickly as possible. Embodiments of the invention provide a method and system to display a sample paycheck allowing the payroll software users to see the effect of their interaction with the payroll software at the same time as they are setting up an employee record (referred to as set up an employee or employee setup). For example, when a payroll software user enters employee name and address, the sample paycheck displays the data in parallel. When the user enters the employee's pay rate, federal status and withholding, the sample paycheck and an associated paystub immediately shows gross and net pay, as well as all of the taxes and deductions. The result is that these users immediately know what they are going to get from the payroll software, thus allowing them to validate that the employee record (also referred to as employee setup record) is set up correctly based on what they see on the sample paycheck.

In one or more embodiments, the employee setup is done within a single user interface (UI) window. While the user is inputting employee data on, for example, one side of the UI window, a sample paycheck is dynamically constructed and updated on the other side of the UI window. As noted above, when the user enters employee name and address, the data may be displayed in parallel on the dynamically updated sample paycheck. Similarly, when the user enters pay rate and tax withholding information, gross and net pay are calculated in real time and shown on the dynamically updated sample paycheck and an accompanying paystub.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a sample paycheck system in accordance with embodiments disclosed herein.

As shown in FIG. 1, the system (100) includes a user (106) using a client device (105) to access a computer system (120) that is installed with a payroll software application (121). In addition, the computer system (120) is coupled with a repository (130) storing an employee record (131), a sample paycheck (132), and a legal paycheck (133). In one or more embodiments, the sample paycheck (132) and the legal paycheck (133) are stored in the repository (130) based on a pre-determined format, such as a text format, a PDF format, a spreadsheet format, an image format, or other suitable data format. In addition, the employee record (131) is stored in the repository (130) as a file, a list, a database, or other suitable data structure. In one or more embodiments, the client device (105) may be a desktop computer, a notebook computer, a tablet computer, a smart phone, or other mobile device with computing and communication capabilities. In one or more embodiments, the user (106) may be any individual who prepares paychecks for a business entity (not shown). For example, the user (106) may be a small business owner, an employee, a contractor, an accountant, a bookkeeper, etc.

In addition, the repository (130) may be a disk memory storage device, a semi-conductor memory storage device, or other suitable computer data storage device. In one or more embodiments, a portion of the repository (130) may be integrated in the computer system (120) and/or the client device (105). In one or more embodiments, the payroll software application (121) or a portion thereof may be downloaded/installed onto the client device (105). The payroll software application (121) may be any payroll software that aids an employer with setting up a plurality of employees on their payroll and to generate the legal documents necessary to pay employees a salary. In one or more embodiments, the client device (105) and the computer system (120) are coupled via a computer network (110). For example, the computer network may include wired and/or wireless portions of public and/or private data network, such as wide area networks (WANs), local area networks (LANs), Internet, a mobile phone network, and etc. In one or more embodiments, the user (106) may access the computer system (120) directly without use of a separate client device, such as the client device (105).

In one or more embodiments, the payroll software application (121) includes the user interface (123) that is configured to receive, from the user (106), a reduced portion of employee setup data prior to receiving a remainder portion of the employee setup data. In particular, the reduced portion of employee setup data includes partial employee payroll information. The employee payroll information, as is known to those skilled in the art, may include an employee name, an employee address, an employee pay rate or salary, employee elected deduction information, employee elected tax withholding information, etc. In one or more embodiments, the reduced portion of employee setup data consists of the employee "State", pay rate/salary, employee pay schedule, and employee elected deduction information. Specifically, only a portion of the employee address is included in the reduced portion of the employee setup data. Said in other words, only "State" information is included in the reduced portion from the "Street," "City," "State," and "Country" information in the full address.

The user interface (123) is configured to input the reduced portion of employee setup data into the payroll software application (121). In one or more embodiments, inputting the reduced portion includes storing the reduced portion as the employee record (131), or a portion thereof. In one or more embodiments, the user interface (123) presents a user interface (UI) window on the client device (105) to request the reduced portion from the user (106). For example, the user interface window may include a data entry field for each of the employee "State", pay rate/salary, employee pay schedule, and employee elected deduction information.

In one or more embodiments, the reduced portion includes a substantially smaller subset of data when compared with the complete employee setup data. For example, if the employee setup data includes 6 pages of information that must be populated in the payroll application software (121), then the reduced portion may include only the first page or the first two pages. In one or more embodiments, the reduced portion includes less than 10 items. Said in other words, the user (106) is requested to answer less than 10 questions presented by the user interface (123) to sufficiently provide the reduced portion. For example, less than 10 questions in the user interface (123) may be displayed on the client device (105) and presented to the user (106).

The remainder portion of employee data that is entered after generation of the sample paycheck may include gender, social security number, department, full address, phone number, email address, sick and vacation balances, employee bank account information, employee hire date, employee workers compensation class, additional employee withholding allowance information (e.g., form W-4 Employee's Withholding Allowance Certificate), employment eligibility information (e.g., form 1-9, Employment Eligibility Verification), etc.

Continuing with FIG. 1, in one or more embodiments, the payroll software application (121) includes a sample check generator (124) that is configured to dynamically generate, prior to receiving the remainder portion of employee data, the sample paycheck (132) based on the reduced portion. In one or more embodiments, generating the sample paycheck (132) includes using a pre-determined algorithm to determine one or more of (i) a gross pay amount based on the employee pay rate, (ii) a deduction amount based at least on the employee elected deduction information and/or the employee elected tax withholding information, (iii) a net pay amount based on the gross pay amount and the deduction amount, and (iv) a year-to-date (YTD) amount associated with one or more of the gross pay amount, the deduction amount, and the net pay amount. In one or more embodiments, the pre-determined algorithm may be based on state and federal tax laws/rules that may be stored in the repository (130) or the payroll software application (121). The sample check generator (124) may access these rules to determine the algorithms for calculating the figures displayed on the sample paycheck. In one or more embodiments, the sample paycheck (132) includes a paystub generated based on one or more of the gross pay amount, the deduction amount, the net pay amount, and the YTD amount (s). In one or more embodiments, the sample paycheck (132) is updated in response to receiving each of the items in the reduced portion of the employee setup data. In one or more embodiments, the sample paycheck (132) only includes the paystub without a faux check itself.

Further, in one or more embodiments, the sample paycheck (132) is embedded with a water-mark to distinguish the sample paycheck (132) from the legal paycheck (133). For example, the sample paycheck (132) may be marked to indicate that it is only for the purpose of validating employee setup and is not a legal negotiable financial paper. Said in other words, the sample paycheck (132) will not be accepted by any financial institution for cashing the check. In contrast, the legal paycheck (133) is legal negotiable financial paper used by the employer to pay the employee as compensation for services rendered. Said in other words, the legal paycheck (133) is generally accepted by a financial institution for cashing.

In one or more embodiments, the user interface (123) is further configured to present the sample paycheck (132) to the user (106). For example, a paycheck image representing the sample paycheck (132) may be displayed in a user interface window on the client device (105). In one or more embodiments, the sample paycheck (132) is dynamically generated and presented as the reduced portion of employee setup data is inputted. For example, when each of employee name, employee address, employee pay rate, employee elected deduction information, employee elected tax withholding information, etc. is entered by the user (106) into a data entry field of the user interface window on the client device (105), the sample paycheck (132) is incrementally revised/updated. For example, one or more of the payee, date, memo, authorized signature, gross pay amount, deduction amount, net pay amount, and YTD amount(s) contained in the sample paycheck (132) may be revised/updated in the user interface window on the client device (105) when each additional employee setup data is entered by the user (106) via the user interface window. This incremental revision/updating of one or more elements of the sample paycheck (132) is referred to as dynamically generating the sample paycheck (132). In one or more embodiments, the sample paycheck (132) is displayed in a pre-determined format, such as a text format, a PDF format, a spreadsheet format, an image format, or other suitable data format.

In one or more embodiments, the user interface (123) is further configured to receive, in response to presenting the sample paycheck (132) to the user (106), the remainder portion of employee setup data for later use by the payroll software application (121) during generation of the legal paycheck (133) for the user (106).

In one or more embodiments, the payroll software application (121) includes an employee record generator (125) that is configured to set up the employee record (131) based on the reduced portion. For example, the employee record generator (125) configures a data structure (e.g., a table, a list, a database, etc.) to store the reduced portion inputted by the user interface (123). Further, the employee record generator (125) may receive, in response to presenting the sample paycheck (132), an input from the user (106) identifying an error in the employee record (131). For example, the input may be received via the user interface (123). Specifically, upon viewing the image of the sample paycheck (132) displayed on the client device (105), the user (106) may recognize an inconsistency, an irregularity, or other indication of an error. Accordingly, the user (106) may request to correct the error. In one or more embodiments, the error is corrected by the employee record generator (125) and the sample paycheck (132) is updated, in response to correcting the error, by the sample paycheck generator (124). For example, the user may correct the error in a user interface (e.g., browser) on the client device (105), which in turn transmits the correction to the employee record generator (125).

An example of receiving partial employee setup data, dynamically generating the sample paycheck, receiving a user indication of error, and updating the sample paycheck in response to correcting the error is described in reference to FIG. 3 below.

Figure 2A:
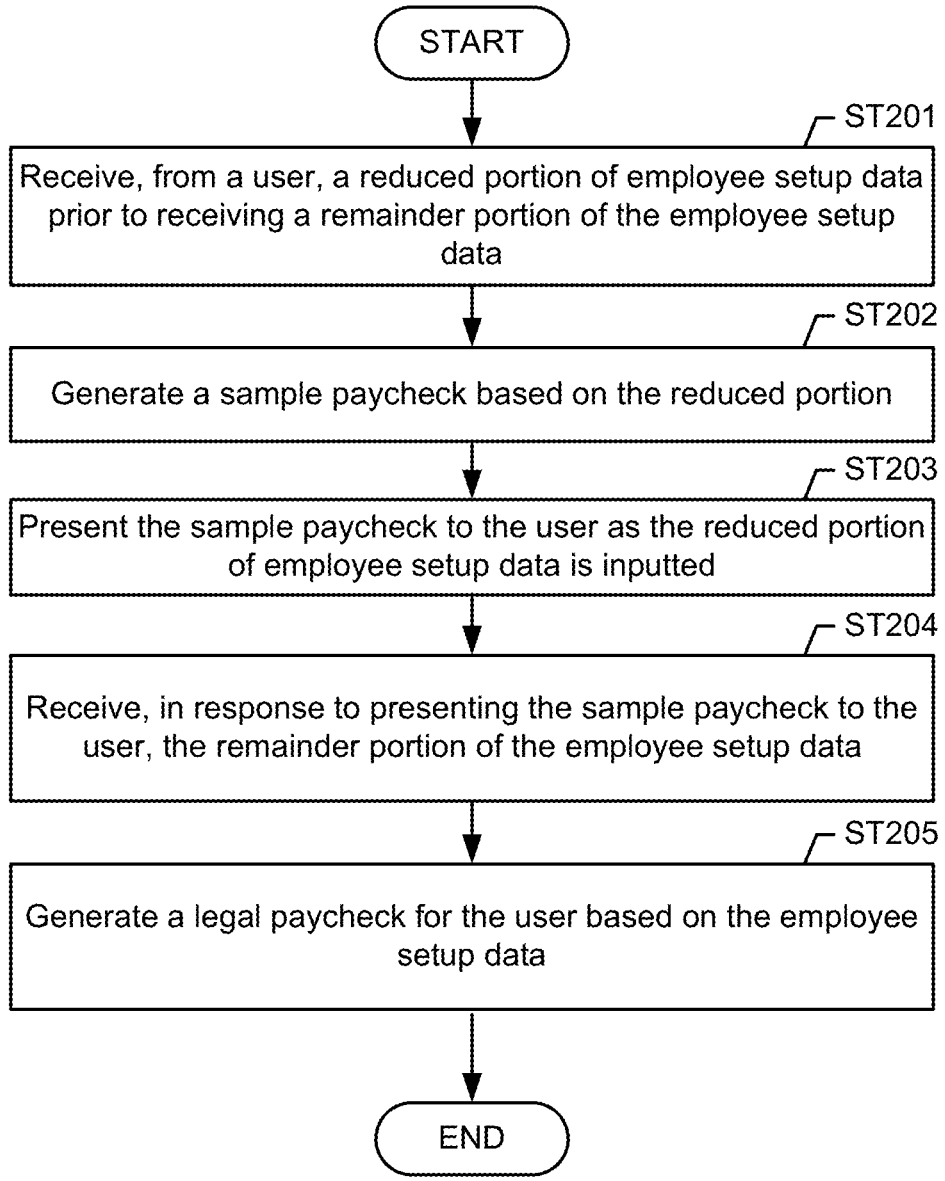
FIGS. 2A and 2B show a flowchart of a method for dynamic sample paycheck in accordance with one or more embodiments of the invention.
Figure 2B:
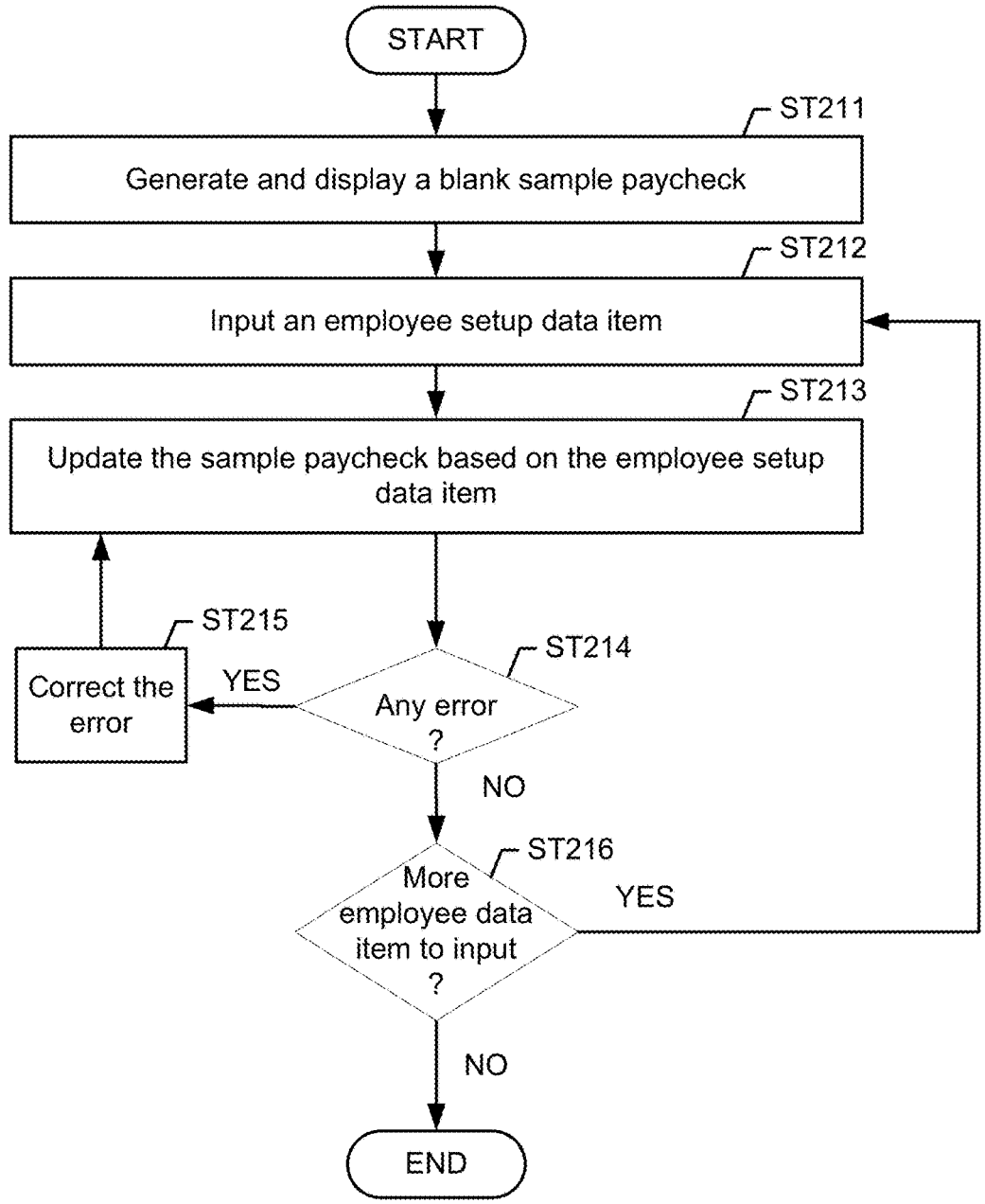

FIGS. 2A and 2B depict a flowchart of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments, the method described in reference to FIGS. 2A and 2B may be practiced using the system (100), in particular using the payroll software application (121).

FIG. 2A shows a flowchart of generating and presenting a sample paycheck with partial employee setup data. Initially in Step 201, a reduced portion of employee setup input data is requested and received from a user. For example, the reduced portion may include one or more of an employee name, an employee address, an employee pay rate, employee elected deduction information, and employee elected tax withholding information. In one or more embodiments, the reduced portion includes a substantially smaller subset compared to the complete employee setup data. For example, the remainder portion may include prior payroll information of each employee, employer information that are received later after the sample paycheck is generated and presented. As noted above, the employer information may include employee department information, employment eligibility verification, etc. In one or more embodiments, the reduced portion is requested and received via a user interface window of a payroll software application. Specifically, the reduced portion is inputted into the payroll software application as a portion of an employee record. Accordingly, the employee record is completed later with the remainder portion of the employee setup data.

In Step 202, the sample paycheck is generated based on the reduced portion and prior to receiving the remainder portion. In one or more embodiments, generating the sample paycheck includes using a pre-determined algorithm to determine one or more of (i) a gross pay amount based on the employee pay rate, (ii) a deduction amount based at least on the employee elected deduction information and/or the employee elected tax withholding information, (iii) a net pay amount based on the gross pay amount and the deduction amount, and (iv) a year-to-date (YTD) amount associated with one or more of the gross pay amount, the deduction amount, and the net pay amount. In one or more embodiments, one or more of the YTD amounts may be derived from retrieved prior payroll information. In one or more embodiments, one or more of the YTD amounts may be obtained from the user. In one or more embodiments, the pre-determined algorithm may be based on state and federal tax laws/rules that may be stored in the repository or the payroll software. The payroll software may access these rules to determine the algorithms for calculating the figures displayed on the sample paycheck. In one or more embodiments, the sample paycheck is generated based on a pre-determined format, such as a text format, a PDF format, a spreadsheet format, an image format, or other suitable data format.

In Step 203, the sample paycheck is presented to the user as the reduced portion of employee setup data is inputted. Specifically, the sample paycheck is presented to the user before the remainder of the employee setup data is received. For example, the sample paycheck may be electronically displayed, printed, or otherwise presented to the user. In one or more embodiments of the invention, the sample paycheck is displayed adjacent to the already-entered reduced portion of employee data. More specifically, the sample paycheck may be displayed in a same UI window, next to the entry fields of the employee setup data that are populated by the user. In addition, the sample paycheck may be displayed with a water mark or other indication that the check displayed is not a legal financial check. In one or more embodiments, the sample paycheck is displayed in a pre-determined format, such as a text format, a PDF format, a spreadsheet format, an image format, or other suitable data format. In one or embodiments, the sample paycheck is presented to the user in response to an input from the user. For example, the sample paycheck is displayed when the user click a "sample paycheck" button in the UI window.

In Step 204, in response to presenting the sample paycheck to the user, the remainder portion of the employee setup data is received for use by the payroll software application during generation of the legal paycheck for the user. In one or more embodiments, the user may identify an inconsistency, irregularity, or other types of error in the reduced portion of the employee setup data when, or as a result of, viewing the sample paycheck. Accordingly, the user may correct the error by revising the employee setup data.

In Step 205, in one or more embodiments, the legal paycheck is generated after the employee setup data is validated by the user based on reviewing the sample paycheck. In particular, the remainder portion of the employee setup data is entered by the user after the user is satisfied with reviewing the sample paycheck. Accordingly, the aforementioned employee record is completed based on both the reduced portion and the remainder portion of the employee setup data. In one or more embodiments, the legal paycheck is generated after the employee record is completed.

FIG. 2B shows more details of generating and presenting the sample paycheck shown in FIG. 2A. Initially in Step 211, a blank sample paycheck is generated and displayed. In one or more embodiments, the blank sample paycheck is a paycheck template including a payee field, a date field, an amount field, a memo field, a signature field, and various fields typically found in a paystub. In particular, these various fields are blank and do not contain any specific information. In one or more embodiments, the blank sample paycheck is included in a user interface window of a payroll software application. For example, the user interface window is presented to an accountant user for setting up an employee record.

In Step 212, an employee setup data item is inputted. In particular, the employee setup data item is inputted into the aforementioned payroll software application as part of an employee record. Specifically, the employee setup data item is one of several data items in the reduced portion of the employee setup data shown in FIG. 2A above. In one or more embodiments, the employee data item is received via the user interface window described in Step 211 above. For example, the user interface window includes data entry fields and associated instructions to request the user to enter the employee setup data. In one or more embodiments, several data items in the reduced portion are entered into these data entry fields in a sequential manner. Specifically, iterations through Steps 212 through 216 form a sequence of entering these data items in the reduced portion of the employee setup data.

In Step 213, the sample paycheck is updated based on the employee setup data item. In one or more embodiments, the sample paycheck displayed in the user interface window of the payroll software application is updated each time one of several data items in the reduced portion are entered (i.e., into data entry fields of the user interface window). For example, one or more of the payee field, date field, amount field, memo field, signature field, and various fields typically found in a paystub may be updated based on the employee setup data item. Initially, when the sample paycheck is blank, one or more of these fields is filled in based on the employee setup data item. In a subsequent iteration, one or more of these fields may be revised based on the employee setup data item.

In Step 214, a determination is made as to whether any error exists. In one or more embodiments, an inconsistency, irregularity, or other type of error is determined based on an input of the user. For example, the user may indicate that an error is found in the sample paycheck and/or the employee record. In one or more embodiments, it is determined that no error exist unless the user specifically indicates the error. If the user indicates that the error is found, the method proceeds to Step 215 where the error is corrected before returning to Step 213. For example, the user may revise an earlier entered employee setup data item to correct the error. In another example, the user may enter a missing employee setup data item to correct the error. Accordingly, the sample paycheck may then be updated based on the revised or newly entered employee setup data item.

Returning to the discussion of Step 214, if the user does not indicate any error, the method continues to Step 216. In Step 216, another determination is made as to whether there is any additional employee data item in the reduced portion to be inputted. If the answer is yes, the method returns to Step 212 to continue the iterations. If the answer is no, the method ends. Said in other words, the reduced portion is completely entered by the user and any additional data item entered by the user is considered to be part of the remainder portion. For example, the remainder portion of the employee setup data may relate to employee department information and does not change the sample paycheck any further.

FIGS. 3A-3E show an example of generating a sample paycheck in accordance with one or more embodiments of the invention. This example may be practiced using the system (100) of FIG. 1 and based on the methods described with respect to FIGS. 2A and 2B above.

FIG. 3A shows a screenshot A (300a) depicting a user interface window of a payroll software application. In particular, the user interface window allows an accountant user to set up an employee (i.e., to complete an employee record) in the payroll software application. Specifically, the left side of the screenshot A (300a) shows data entry fields for entering a reduced portion of employee setup data while the right side of the screenshot A (300a) shows the sample paycheck (304). As shown, the data entry fields include Federal and State tax withholding information (301), pay rate and schedule information (302), and optional deduction information (303). In addition, the sample paycheck (304) includes the cheque (305) and the paystub (306). Further, the sample paycheck (304) is a blank template having a blank payer field, a blank date field, a blank payee field, a blank amount field, a blank courtesy amount field, a blank memo field, a blank signature field, and various fields typically found in a paystub that are also blank. The sample paycheck (304) has a watermark "SAMPLE ONLY" to indicate that this is not a negotiable financial instrument. Specifically, the watermark is to differentiate the sample paycheck (304) from a legal paycheck that is generated later. As noted above, the sample paycheck (304) may only include the paystub (306) without showing the cheque (305).

Figure 3B:
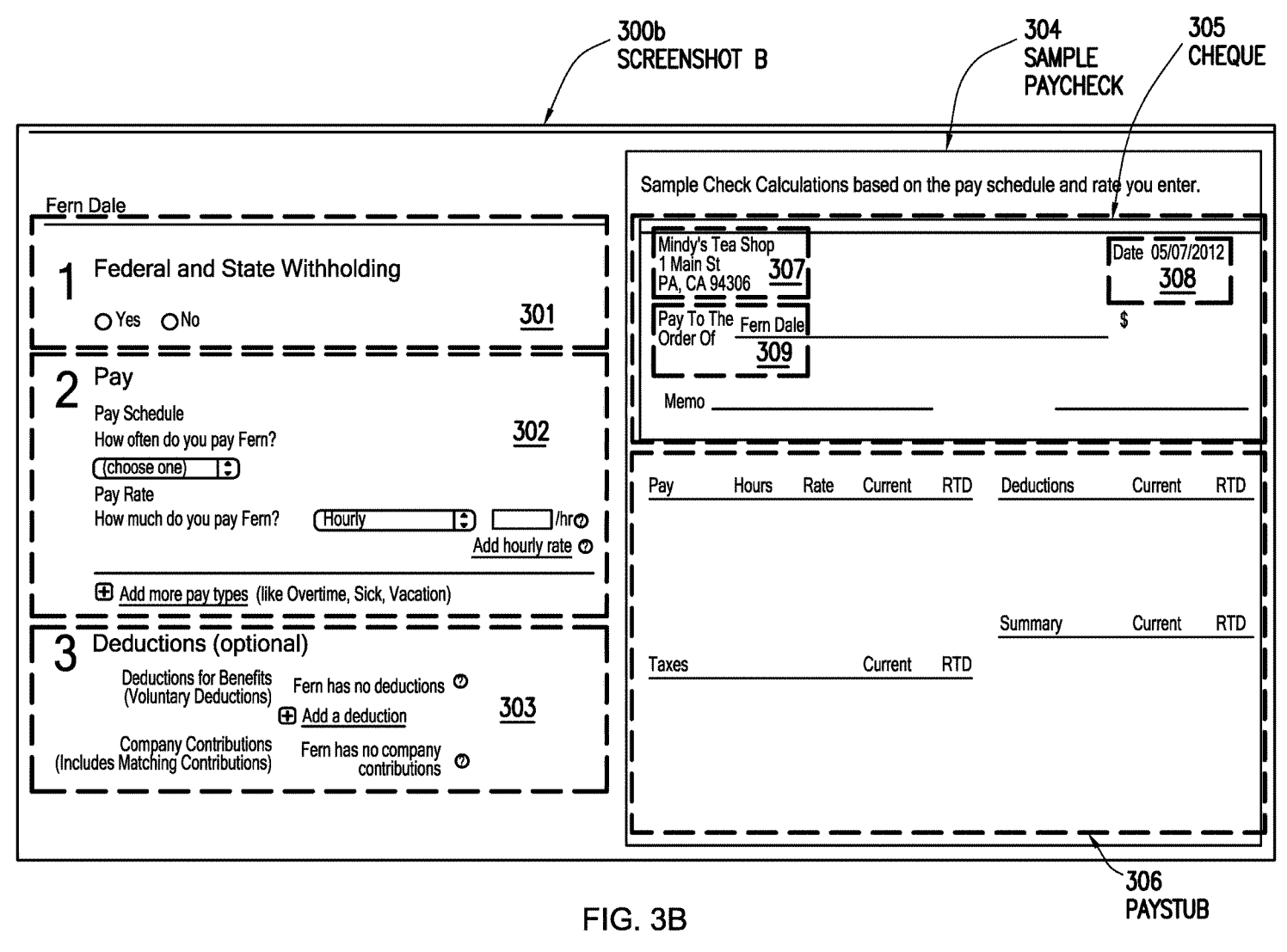

FIG. 3B shows a screenshot B (300b) depicting the same user interface window shown in FIG. 3A after the user has entered a portion of the employee setup data. The sample paycheck (304) is updated based on what the user has entered so far. For example, the blank payer field is now filled with the employer information (307) "Mindy's Tea Shop" and "1 Main St, PA, CA94306," the blank date field is now filled with the pay date (308) "May 7, 2012," and the blank payee field is now filled with the payee name (309) "Fern Dale." Although the sample paycheck (304) is shown as a faux check (i.e., cheque (305)), those skilled in the art, with the benefit of this disclosure, will appreciate that other format may be used to display the sample paycheck (304) to present pertinent information contained therein. For example, the sample paycheck (304) may be presented in any one of a text format, a PDF format, a spreadsheet format, an image format, or other suitable data format.

Figure 3C:
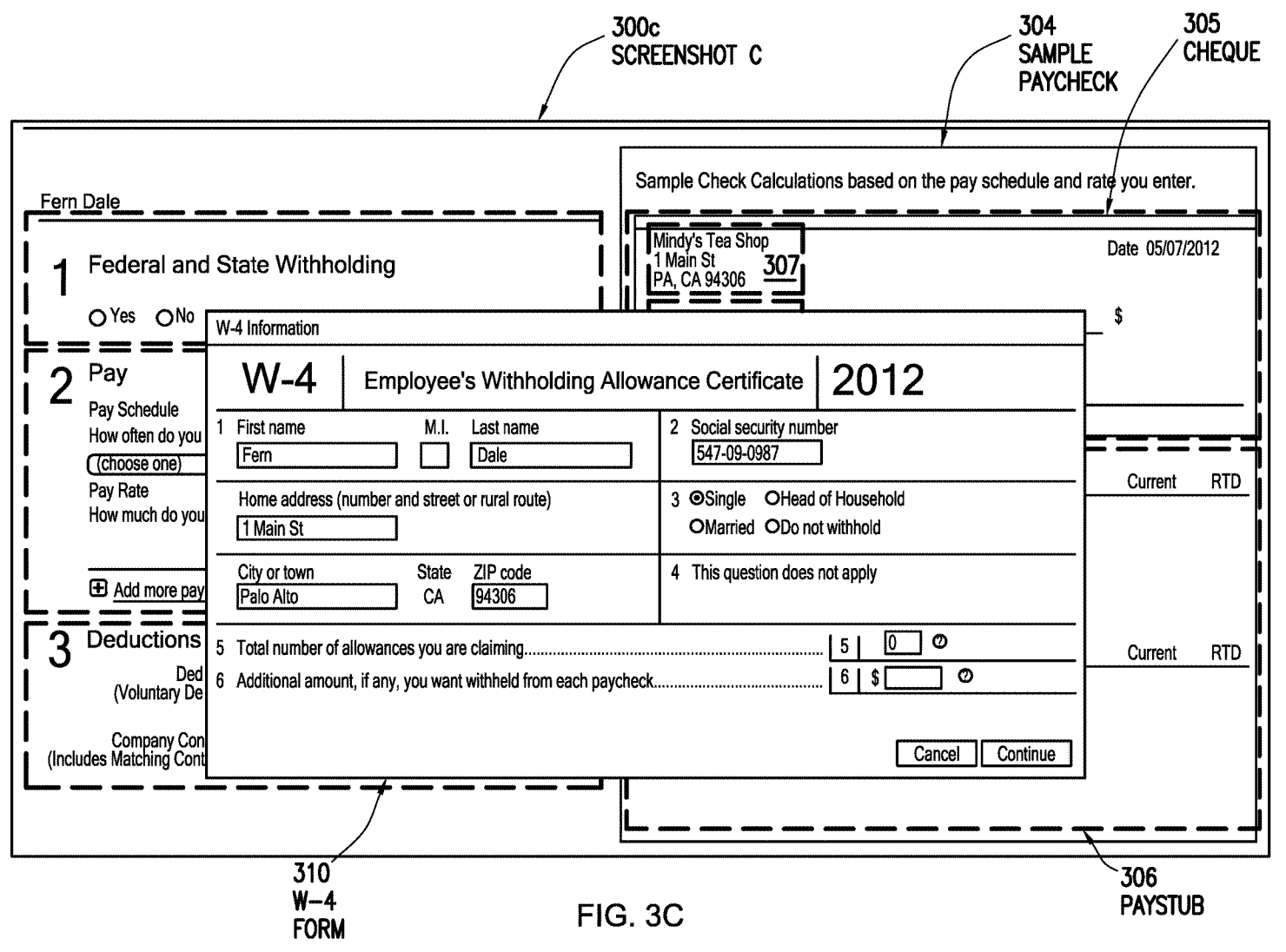

FIG. 3C shows a screenshot C (300c) depicting the same user interface window shown in FIGS. 3A and 3B after the user has identified a W-4 form (310) of the employee "Fern Dale" to complete the employee setup data. As shown, the W-4 form (310) is displayed as an overlaying floating window. In one or more embodiments, the information contained in the W-4 form (310) is automatically extracted and entered into payroll software application as part of the employee record. Specifically, this information is entered as part of the reduced portion of the employee setup data.

Figure 3D:
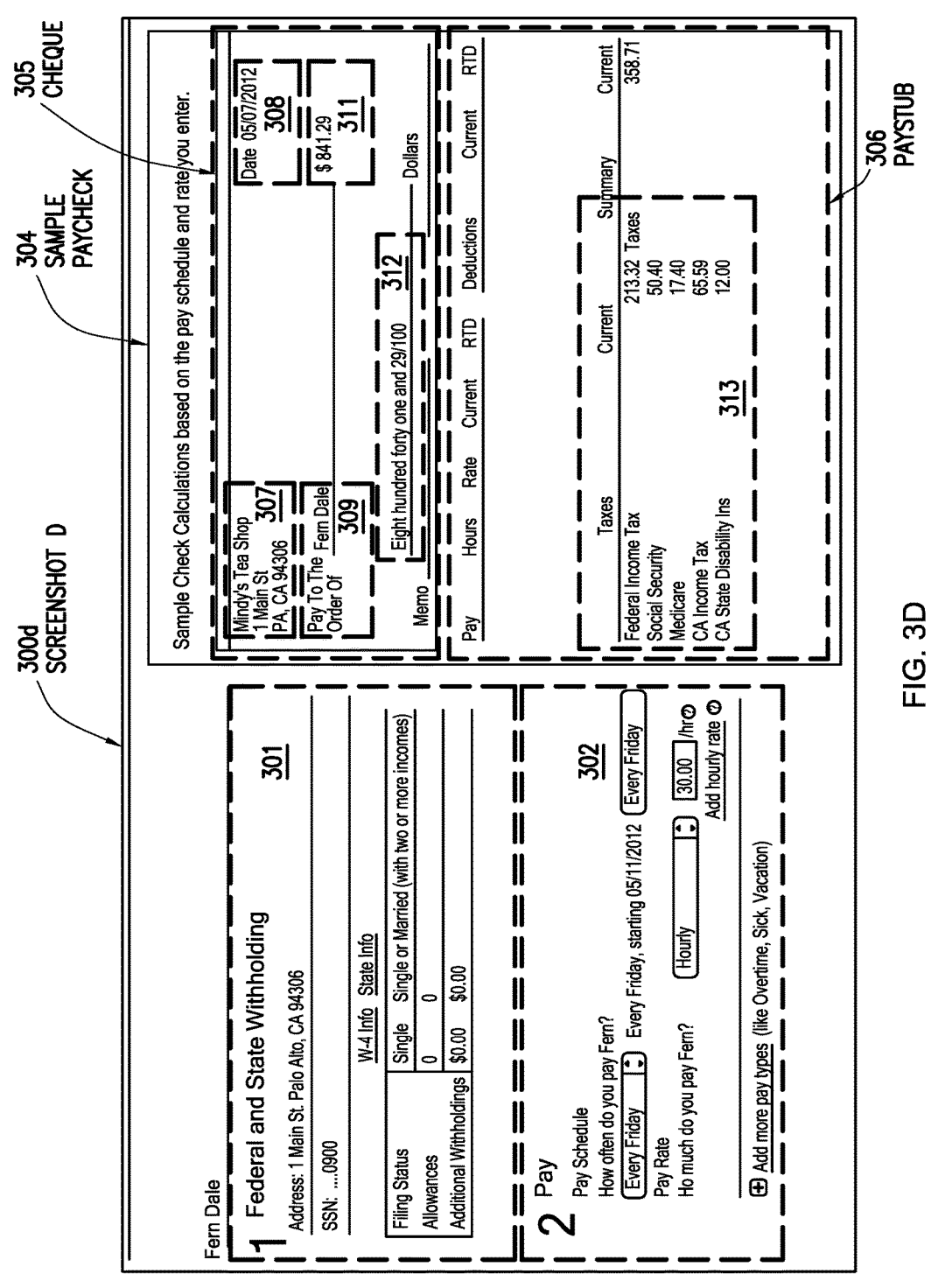

FIG. 3D shows a screenshot D (300d) depicting the same user interface window shown in FIGS. 3A, 3B, and 3C after the information contained in the W-4 form (310) has been automatically extracted and entered into payroll software application as part of the employee record. The sample paycheck (304) is updated based on both manually entered information and automatically extracted information. For example, the blank courtesy amount field is now filled with the courtesy amount (311) "$841.29," the blank amount field is now filled with the amount (312) "Eight hundred forty one and 29/100," and the blank paystub fields are now filled with various paystub information (313).

FIG. 3E shows a screenshot E (300e) depicting the same user interface window shown in FIGS. 3A, 3B, 3C, and 3D after the user indicates that an error is identified. For example, the user has activated a correction dialog box (314) to correct the error by entering a missing State tax withholding information using the correction dialog box (314) or to revise a previously entered State tax withholding information using the correction dialog box (314). Once the error is corrected, the user may validate the sample paycheck (304) and continue to enter additional employee setup data that no longer changes the sample paycheck (304). Upon successfully entering both the reduced portion and the remainder portion of the employee setup data to complete the employee record, the user is then ready to use the payroll software application. Specifically, the user will generate a legal paycheck for the employee "Fern Dale" when it is time to run the payroll.

Figure 4:
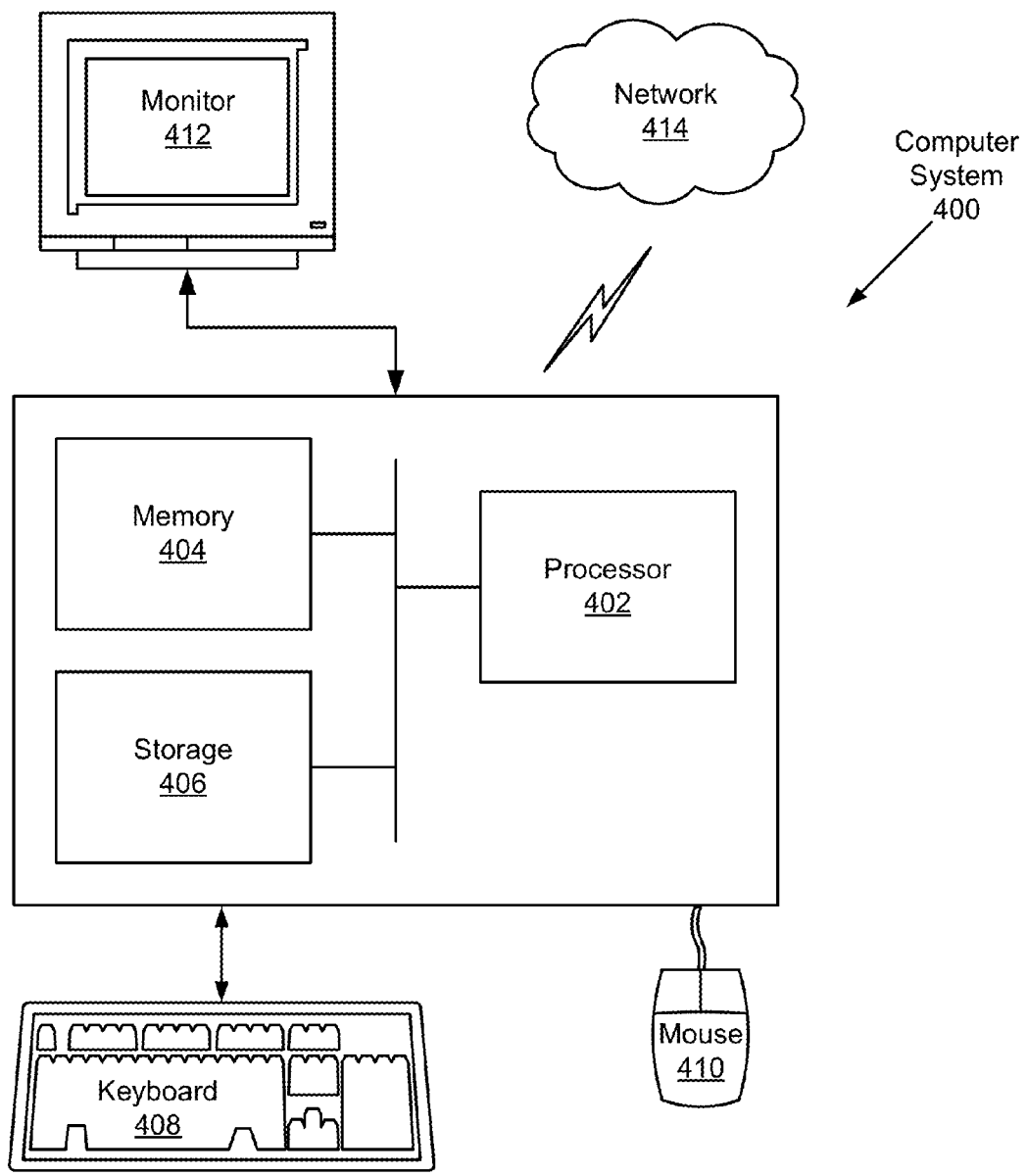
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection. Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring a payroll software application to generate a legal paycheck, comprising:
receiving, by a computer processor and from a user, a reduced portion of employee setup data prior to receiving a remainder portion of the employee setup data, wherein the reduced portion of employee setup data comprises a plurality of employee set up data items from partial employee payroll information;
inputting the reduced portion of employee setup data into the payroll software application to configure an employee record, wherein the plurality of employee set up data items are inputted one at a time in a sequential manner;
dynamically generating, by the computer processor and prior to receiving the remainder portion, a sample paycheck by:
  displaying a replica of the legal paycheck, wherein the replica comprises a plurality of blank fields of the legal paycheck;
  inserting information into a portion of the plurality of blank fields based on the reduced portion of the employee setup data, wherein other information related to the remainder portion of the employee setup data is not included in the replica;
  presenting, prior to receiving the remainder portion, the replica of the legal paycheck to the user as the sample paycheck, wherein the sample paycheck is not accepted by any financial institution for cashing; and
  updating, in response to inputting each of the plurality of employee set up data items in the sequential manner, the sample paycheck as a sequence of incrementally revised sample paychecks,
  wherein the sequence of incrementally revised sample paychecks presents, to the user, an effect of the user interacting with the payroll software application;
receiving, in response to presenting and updating the sample paycheck, an input from the user identifying an error in the employee record;
correcting, in response to the input from the user, the error to update the sample paycheck;
receiving, from the user and in response to updating the sample paycheck, the remainder portion; and
generating, in response to receiving the remainder portion, the legal paycheck for the user, wherein the legal paycheck is accepted by a financial institution for cashing.

2. The method of claim 1, further comprising:
requesting, from the user, the reduced portion comprising at least one selected from a group consisting of an employee name, an employee address, an employee pay rate, employee elected deduction information, and employee elected tax withholding information.

3. The method of claim 2, further comprising:
determining, using a pre-determined algorithm:
  a gross pay amount based on the employee pay rate;
  a deduction amount based on at least one selected from a group consisting of the employee elected deduction information and the employee elected tax withholding information; and
  a net pay amount based on the gross pay amount and the deduction amount,
wherein the sample paycheck is generated based on the gross pay amount and the deduction amount.

4. The method of claim 3, further comprising:
determining a year-to-date (YTD) amount associated with at least one selected from a group consisting of the gross pay amount, the deduction amount, and the net pay amount,
wherein the sample paycheck comprises a paystub generated based on at least one selected from a group consisting of the gross pay amount, the deduction amount, the net pay amount, and the YTD amount.

5. The method of claim 1, further comprising:
updating the sample paycheck in response to receiving each of a plurality of items comprised in the reduced portion.

6. The method of claim 5, further comprising:
displaying a plurality of input fields in a user interface (UI) window for receiving the plurality of items,
wherein presenting the sample paycheck comprises:
  displaying the sample paycheck in the UI window; and
  dynamically updating, in response to receiving each of the plurality of items, the sample paycheck in the UI window.

7. The method of claim 1, further comprising:
embedding, in the sample paycheck, a water-mark to distinguish the sample paycheck from the legal paycheck.

8. A system configuring a payroll software application to generate a legal paycheck, comprising:
a processor;
memory storing instructions to implement a payroll software application, the instructions, when executed by the processor, comprising functionality to:
  receive, from a user, a reduced portion of employee setup data prior to receiving a remainder portion of the employee setup data, wherein the reduced portion of employee setup data comprises a plurality of employee set up data items from partial employee payroll information;
  input the reduced portion of employee setup data into the payroll software application to configure an employee record, wherein the plurality of employee set up data items are inputted one at a time in a sequential manner;
  dynamically generate, prior to receiving the remainder portion, a sample paycheck by:
    displaying a replica of the legal paycheck, wherein the replica comprises a plurality of blank fields of the legal paycheck;
    inserting information into a portion of the plurality of blank fields based on the reduced portion of the employee setup data, wherein other information related to the remainder portion of the employee setup data is not included in the replica;
    presenting, prior to receiving the remainder portion, the replica of the legal paycheck to the user as the sample paycheck, wherein the sample paycheck is not accepted by any financial institution for cashing; and
    updating, in response to inputting each of the plurality of employee set up data items in the sequential manner, the sample paycheck as a sequence of incrementally revised sample paychecks,
    wherein the sequence of incrementally revised sample paychecks presents, to the user, an effect of the user interacting with the payroll software application;
  receive, in response to presenting and updating the sample paycheck, an input from the user identifying an error in the employee record;
  correct, in response to the input from the user, the error to update the sample paycheck;
  receive, from the user and in response to updating the sample paycheck, the remainder portion; and generate, in response to receiving the remainder portion, the legal paycheck for the user, wherein the legal paycheck is accepted by a financial institution for cashing; and a user device comprising a user interface (UI), wherein the UI is configured to display the replica of the legal paycheck to the user as the sample paycheck.

9. The system of claim 8, the UI further configured to:
request, from the user, the reduced portion comprising at least one selected from a group consisting of an employee name, an employee address, an employee pay rate, employee elected deduction information, and employee elected tax withholding information.

10. The system of claim 9, the instructions, when executed by the processor, further comprising functionality to:
determine, using a pre-determined algorithm:
a gross pay amount based on the employee pay rate;
a deduction amount based on at least one selected from a group consisting of the employee elected deduction information and the employee elected tax withholding information; and
a net pay amount based on the gross pay amount and the deduction amount.

11. The system of claim 10, the instructions, when executed by the processor, further comprising functionality to:
determine a year-to-date (YTD) amount associated with at least one selected from a group consisting of the gross pay amount, the deduction amount, and the net pay amount,
wherein the sample paycheck comprises a paystub generated based on at least one selected from a group consisting of the gross pay amount, the deduction amount, the net pay amount, and the YTD amount.

12. The system of claim 8, the UI further configured to:
display a plurality of input fields in a user interface (UI) window for receiving the plurality of employee set up data items,
wherein presenting the sample paycheck comprises:
displaying the sample paycheck in the UI window; and
updating, in response to receiving each of the plurality of employee set up data items, the sample paycheck in the UI window.

13. The system of claim 8, the instructions, when executed by the processor, further comprising functionality to:
embed, in the sample paycheck, a water-mark that distinguishes the sample paycheck from the legal paycheck.

14. A non-transitory computer readable medium storing instructions configuring a payroll software application to generate a legal paycheck, the instructions, when executed by a computer processor, comprising functionality to:
receive, from a user, a reduced portion of employee setup data prior to receiving a remainder portion of the employee setup data, wherein the reduced portion of employee setup data comprises a plurality of employee set up data items from partial employee payroll information;
input the reduced portion of employee setup data into the payroll software application to configure an employee record, wherein the plurality of employee set up data items are inputted one at a time in a sequential manner;
dynamically generate, prior to receiving the remainder portion, a sample paycheck by:

displaying a replica of the legal paycheck, wherein the replica comprises a plurality of blank fields of the legal paycheck;
inserting information into a portion of the plurality of blank fields based on the reduced portion of the employee setup data, wherein other information related to the remainder portion of the employee setup data is not included in the replica;
presenting, prior to receiving the remainder portion, the replica of the legal paycheck to the user as the sample paycheck, wherein the sample paycheck is not accepted by any financial institution for cashing; and
updating, in response to inputting each of the plurality of employee set up data items in the sequential manner, the sample paycheck as a sequence of incrementally revised sample paychecks,
wherein the sequence of incrementally revised sample paychecks presents, to the user, an effect of the user interacting with the payroll software application;
receive, in response to presenting and updating the sample paycheck, an input from the user identifying an error in the employee record;
correct, in response to the input from the user, the error to update the sample paycheck;
receive, from the user and in response to updating the sample paycheck, the remainder portion; and
generate, in response to receiving the remainder portion, the legal paycheck for the user, wherein the legal paycheck is accepted by a financial institution for cashing.

15. The non-transitory computer readable medium of claim 14, the instructions, when executed by the computer processor, further comprising functionality to:
request, from the user, the reduced portion comprising at least one selected from a group consisting of an employee name, an employee address, an employee pay rate, employee elected deduction information, and employee elected tax withholding information.

16. The non-transitory computer readable medium of claim 15, the instructions, when executed by the computer processor, further comprising functionality to:
determine, using a pre-determined algorithm:
a gross pay amount based on the employee pay rate;
a deduction amount based on at least one selected from a group consisting of the employee elected deduction information and the employee elected tax withholding information; and
a net pay amount based on the gross pay amount and the deduction amount,
wherein the sample paycheck is generated based on the gross pay amount and the deduction amount.

17. The non-transitory computer readable medium of claim 16, the instructions, when executed by the computer processor, further comprising functionality to:
determine a year-to-date (YTD) amount associated with at least one selected from a group consisting of the gross pay amount, the deduction amount, and the net pay amount,
wherein the sample paycheck comprises a paystub generated based on at least one selected from a group consisting of the gross pay amount, the deduction amount, the net pay amount, and the YTD amount.

18. The non-transitory computer readable medium of claim 14, the instructions, when executed by the computer processor, further comprising functionality to:

update the sample paycheck in response to receiving each of a plurality of items comprised in the reduced portion.

19. The non-transitory computer readable medium of claim 18, the instructions, when executed by the computer processor, further comprising functionality to:
display a plurality of input fields in a user interface (UI) window for receiving the plurality of items,
wherein presenting the sample paycheck comprises:
displaying the sample paycheck in the UI window; and
dynamically updating, in response to receiving each of the plurality of items, the sample paycheck in the UI window.

20. The non-transitory computer readable medium of claim 14, the instructions, when executed by the computer processor, further comprising functionality to:
embed, in the sample paycheck, a water-mark to distinguish the sample paycheck from the legal paycheck.

* * * * *